United States Patent Office 2,982,147
Patented May 2, 1961

2,982,147

CONTROL SYSTEMS FOR INFINITELY VARIABLE DRIVE RATIO TRANSMISSIONS

Paul Panhard, Paris, France, assignor to Societe Anonyme des Anciens Etablissements et Levassor, Paris, France, a society of France Filed Mar. 6, 1958, Ser. No. 719,667

Claims priority, application France Mar. 8, 1957

3 Claims. (Cl. 74—472)

The present invention relates to a control system for an infinitely variable drive ratio transmission driven by an engine.

The object of this invention is to provide a system of this kind capable, in response to displacements of the throttle pedal, of automatically varying the drive ratio of the transmission in such manner as to obtain the maximum power with the minimum fuel consumption.

For this purpose, according to the invention, said control system comprises, to actuate the liquid feed distributing valve of a servo-motor controlling said variable ratio transmission, a piston or other pressure responsive member subjected in one direction to the action of a pressure proportional to the square of the speed of the engine and urging said piston to actuate said valve toward the position thereof which corresponds to decreasing speed reduction ratios of said transmission, this piston being subjected, in the opposed direction, to the action of spring means compressed in response to downward displacements of the engine throttle pedal.

Thus if the number of revolutions per minute of the engine decreases, the control system acts upon the servo-motor to cause it to increase the speed reduction ratio of the transmission and vice versa.

Thus the number of r.p.m. of the engine is stabilized to a given value depending upon the position of the throttle pedal.

A preferred embodiment of this invention will be hereinafter described with reference to the accompanying drawings given merely by way of example and in which.

Figure 1:
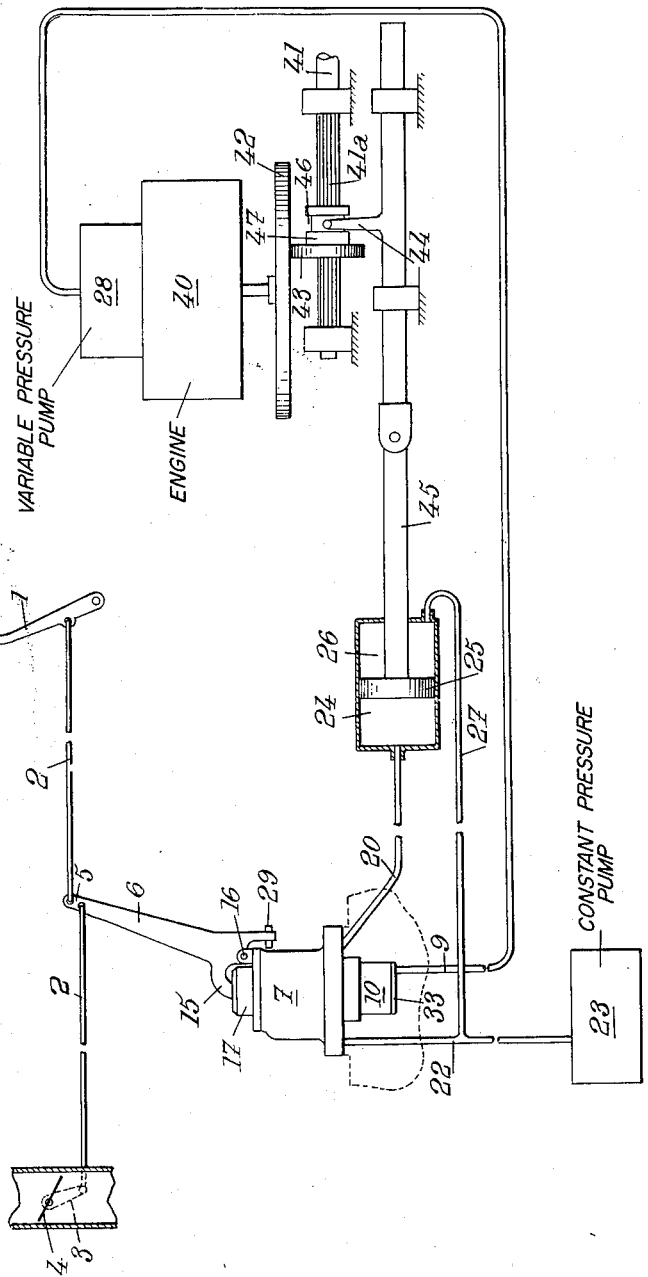
Fig. 1 shows the lay-out of an infinitely variable drive ratio transmission provided with a control system made according to an embodiment of the present invention.

As shown by Fig. 1, a throttle pedal 1 is connected, through links 2, with a lever 3 fixed on the spindle of the carburettor throttle valve 4.

Figure 2:
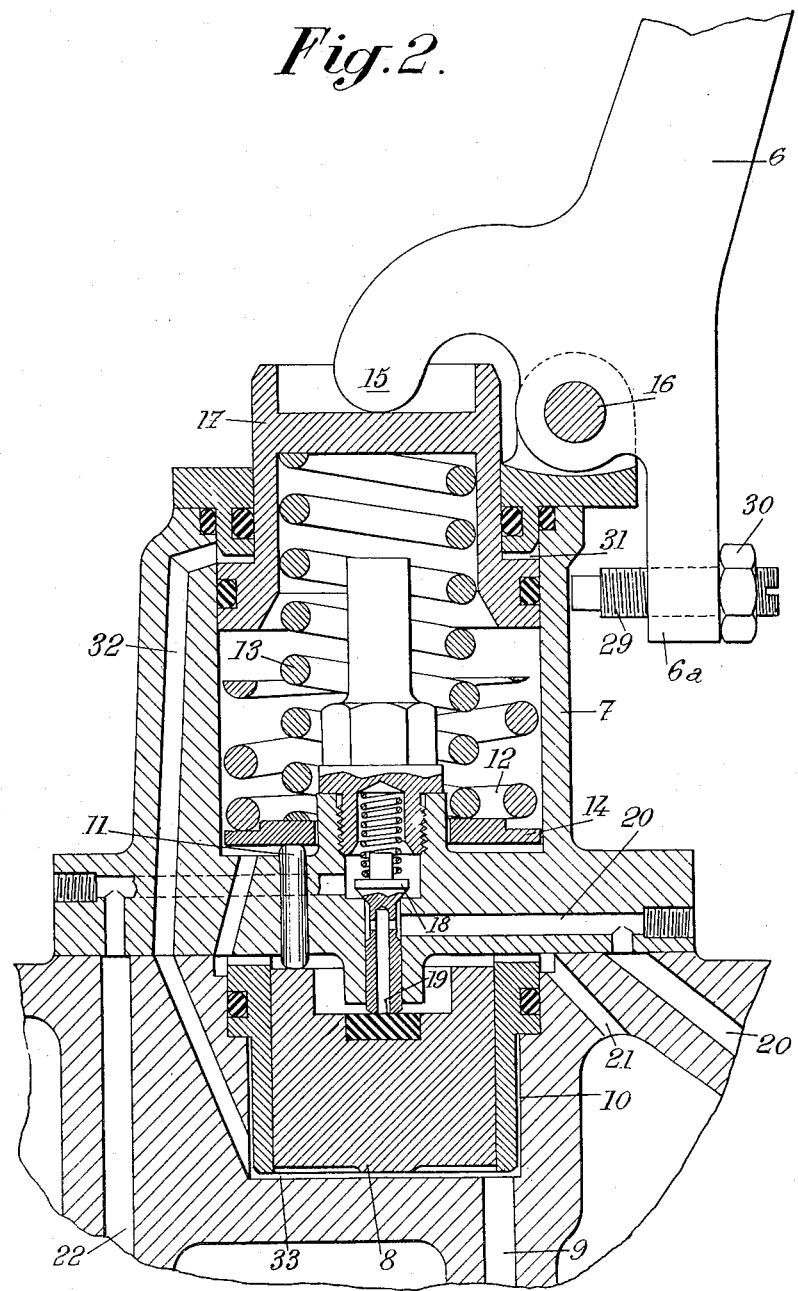
Fig. 2 is a vertical section on an enlarged scale of the essential elements of the control system proper.

Links 2 are connected at 5 to the lever 6 of a control device 7 visible on an enlarged scale on Fig. 2.

This control system essentially includes a piston 8 the under face of which is subjected to a liquid pressure proportional to the square of the speed of the internal combustion engine 40. This liquid under pressure is supplied by a pump 28 driven by said engine 40 and liquid is transmitted from device 28 to the under face of piston 8 through a conduit 9.

Device 28 may be of any suitable kind and in particular, it is made as described in my copending application Serial No. 719,414, filed March 5, 1958, now Patent Number 2,904,326, issued September 15 1959, for "improvements in devices responsive to the speed of a rotating shaft and in particular to centrifugal governors."

Piston 8 moves in a substantially liquid-tight manner in a cylinder 10. The upper face of piston 8 is subjected to the downward thrust of at least one push-piece such as 11, itself pushed downwardly by springs 12 and 13 bearing against an annular disc 14 in contact with the top end of push-piece 11. The thrust exerted by said springs is the higher as a finger 15 rigid with lever 6 pivoted at 16 on the fixed body of control device 7 exerts a higher thrust on an auxiliary piston 17 normally engaging the top end of spring 13 and capable also of engaging the top end of spring 12 after a given downward displacement of said auxiliary piston 17.

Thus springs 12 and 13 are the more compressed as the throttle pedal 1 has been given a greater downward displacement.

An upward movement of piston 8 lifts a slide-valve 18, while closing the axial orifice 19 of a channel formed therein and capable of connecting a conduit 20 leading to servo-motor 24 with a discharge conduit 21, said valve 18 being also capable of placing said conduit 20 in communication with a conduit 22 connected with a hydraulic pump 23 driven from any source of power, so as to be constantly able to supply liquid under pressure.

An upward movement of piston 8 therefore causes liquid under pressure to be fed from pump 23 through conduit 22, past valve 18, and through conduit 20 to the chamber 24 of the cylinder of a servo-motor so as to push toward the right the piston 25 of said servo-motor. The opposite face of said piston, which is of smaller useful area (due to the presence of a piston rod) is subjected to the pressure existing in the chamber 26 of said servo-motor, which chamber 26 is fed directly with liquid from pump 23 through conduit 22 and conduit 27.

A downward movement of piston 8 causes piston 25 to move toward the left since, in this case, chamber 26 is under the pressure supplied by pump 23 whereas chamber 24 communicates with discharge conduit 21 through the axial conduit 19 of valve 18.

This arrangement makes it possible to provide a single valve for the feed and the discharge of the power liquid and to eliminate any lag between the movements of the piston in opposed directions.

The pressure in the chamber of cylinder 10 located under piston 8 being proportional to the square of the speed of the engine and the thrust exerted on the top face of said piston 8 depending upon the position of the throttle pedal, to every position of said throttle pedal there corresponds a speed of the engine for which the opposed forces acting on piston 8 balance each other. This means that, as soon as the engine tends to exceed this speed, the liquid under pressure causes the piston 25 of the servo-motor to move toward the right whereas, as soon as the engine tends to slow down, piston 25 is caused to move toward the left.

The infinitely variable drive ratio transmission through which the torque supplied by engine 40 is transmitted to a driven mechanism (not shown) through a driven shaft 41 may be of any type.

For the sake of simplicity, a simple transmission device of this kind has been shown on Fig. 1.

It includes a disc 42 directly driven by engine 40 and frictionally engaging a disc 43 slidable on the splined end $41_a$ of shaft 41. The displacements of disc 43 with respect to said splined portion $41_a$ of shaft 41 are controlled by a finger 44 carried by the rod 45 of the servo-motor piston 25, this finger 44 engaging a groove 46 of a sleeve 47 carrying disc 43.

Thus, when piston 25 is moved toward the left, it causes the speed reduction ratio of said transmission to become higher and higher. On the contrary, when piston 25 is moved toward the right, it causes said speed reduction ratio to become lower and lower.

Let it be supposed that the driver of the vehicle wants to start quickly:

He fully depresses the throttle pedal. Piston 8 pushed downwardly opens the orifice 19 and chamber 24 is brought in communication with discharge conduit 21, which causes the transmission to have a high speed reduction ratio. The engine quickly gathers speed up to the value corresponding to the maximum power production. At this time, the liquid pressure proportional to the square of the speed of the engine becoming higher than the thrust received from the throttle pedal, piston 8 is moved upwardly so as to close the orifice 19 and to open the valve 18. Liquid under pressure is then fed from pump 23 to the chamber 24 of the servo-motor so that the piston thereof moves toward the right and the speed reduction ratio of the transmission is reduced, this ratio being at any time that which enables the engine to run at 5,000 r.p.m. while producing the maximum torque since, as soon as the speed of the engine tends to decrease, the system decreases the speed reduction ratio thus enabling the engine to pick up and to return to said speed.

If on the contrary, the driver wishes to start smoothly, he imparts a smaller downward movement to the throttle pedal, corresponding for instance to ¼ or ⅓ of the full opening of the throttle valve. Thus, as soon as the engine reaches the corresponding speed, the speed reduction ratio is automatically reduced until the resistant torque balances the driving torque corresponding to this opening of the throttle valve.

In order to permit of adjusting the time when the engine starts moving the vehicle, there is provided a screw 29 with a counter-nut 30 carried by an extension $6_a$ of lever 6. This screw subjects spring 13 to an initial tension which is transmitted to piston 8 thus pushed downwardly so as to connect the chamber 24 of the servo-motor with discharge conduit 21 and to move the piston 25 of said servo-motor toward the left (Fig. 1) into the position where the speed reduction ratio is infinite. Thus the vehicle is not driven. If the throttle pedal is depressed, on the one hand the speed of the engine increases so that the pressure transmitted through conduit 9 to chamber 33 under piston 8 (which pressure is proportional to the square of the speed of the engine) is increased, and, on the other hand the thrust transmitted by said spring 13 is slightly increased. As soon as the pressure in chamber 33 urges piston 8 upwardly with a force greater than the thrust exerted on said piston by spring 13, the piston 25 of the servo-motor is moved toward the right. The speed reduction ratio of the transmission passes from an infinite to a finite value and the vehicle starts moving, the more slowly as the throttle pedal has been less depressed.

It should be noted that contrary to what takes place with conventional automatic clutches, as the speed reduction ratio is then still close to an infinite value, it is possible without further depressing the throttle pedal to climb (of course at very low speed) very steep hills since the speed reduction ratio for a given position of the throttle pedal is automatically regulated so as to keep the speed of the engine which depends only upon the position of the throttle pedal.

In order to obtain a good sensitiveness of the device, piston 8 may have an area of about 4 sq. cm. (this indication being given merely by way of example) and the pressure proportional to the square of the speed of the engine may be for instances 10 kgs. per sq. cm. when the engine is running at 5,000 r.p.m. In this case, when the speed is 1,000 r.p.m. this pressure will be $$\frac{10 \text{ kg./sq. cm.}}{5^2} = 0.400 \text{ kg./sq. cm.}$$

Therefore, the resistance of springs 13 and 12 may range from 1.6 kgs. when the engine is running at 1,000 r.p.m. to 40 kgs. when the engine is running at 5,000 r.p.m. This corresponds to a very high thrust to be exerted on the throttle pedal, which would become quite exhausting in the long run.

In order to obviate this drawback, piston 17 is arranged so that its upper face forms with the body of device 7 an annular liquid-tight chamber 31. The annular area of said piston 17 in said chamber 31 is smaller than that of piston 8 but the greater as it is desired more to reduce the thrust to be exerted on the throttle pedal.

This chamber 31 communicates through a conduit 32 with the chamber 33 under piston 8.

In these conditions, if it is desired to obtain a low acceleration, it will suffice to exert a low thrust on the throttle pedal to drive it down whereas if it is desired to obtain a very high acceleration the throttle pedal will oppose a resistance to its being driven down since the speed of the engine does not increase immediately upon the throttle valve being opened.

It should be noted that since small openings of the throttle valve correspond necessarily to low speeds of the engine and great openings to high speeds, atomization of the fuel will always take place in the best possible conditions, that is to say with the minimum consumption.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with an infinitely variable drive ratio transmission driven by an engine, said transmission having a movable control member the position of which determines the drive ratio of said transmission and said engine having a throttle valve and a throttle pedal the position of which determines the power supplied by the engine, said throttle valve being operatively connected with said throttle pedal so that when said throttle pedal is depressed said throttle valve is moved in the opening direction, a control system for said transmission which comprises, in combination, a rigid structure forming a cylindrical housing closed at one end, a piston movable in said housing, so that a variable volume chamber is formed in said closed end of said housing, between it and said piston, means for supplying liquid under a pressure proportional to the square of the speed of said engine to said chamber, a discharge conduit in communication with the other end of said housing, said rigid structure forming, on the other side of said chamber from said piston, guiding means extending in a direction parallel to the axis of said piston, a sliding member movable in said guiding means, said sliding member being operatively connected with said throttle pedal so as to be moved toward said piston in response to downward displacements of said throttle pedal, a push-piece guided longitudinally in said rigid structure located on the same side of said piston as said sliding member, spring means interposed between said sliding member and said push piece to urge said push piece against said piston, a hydraulic servo-motor having a fixed casing and a part movable in said casing between the ends thereof, said part dividing the inside of said casing into two variable volume spaces located on opposite sides thereof, said movable part being operatively connected with said transmission control member, said servo-motor being arranged so that when one of said variable volume spaces thereof is caused to expand, said part moves said transmission control member in the direction corresponding to decreasing speed reduction ratios of said transmission, whereas when said variable volume space is caused to retract, said part moves said transmission control member in the opposed direction, corresponding to increasing speed reduction ratios of said transmission, said rigid structure including a partition transverse to the axis of said piston and located on the other side thereof from said chamber, said partition being provided with a closed recess and with a bore parallel to the axis of said piston, starting from said recess and opening opposite said piston, said rigid structure being provided with a passage opening into said recess, means for feeding power liquid under pressure to said passage, a valve having its stem slidably guided in said bore and its head in said recess, said stem projecting from the end of said bore located opposite said piston, resilient means between said rigid structure and said valve for urging said stem toward said piston, said stem being provided with an axial channel, lateral holes in the wall of said stem, starting from said channel, a passage in said structure extending from the portion of said bore which surrounds the portion of said stem provided with said lateral holes, said last mentioned passage being connected with said variable volume space of said hydraulic servo-motor, whereby, according to the position of said piston in said structure, said second mentioned passage can either be connected with said first mentioned passage or with said discharge conduit or kept out of communication with both said first mentioned passage and discharge conduit.

2. A control system according to claim 1 further including means for exerting an adjustable initial compression on said spring means.

3. A control system according to claim 1 in which the outer surface of said sliding member and said guiding means form between them a liquid-tight variable volume space in communication with said chamber fed with liquid at a pressure proportional to the square of the engine speed, in such manner as to exert on said sliding member a thrust in opposition to the thrust exerted by said spring means on said sliding member.

References Cited in the file of this patent

UNITED STATES PATENTS

| | | |
|---|---|---|
| 1,496,123 | Jones | June 3, 1924 |
| 1,861,008 | Hayes | May 31, 1932 |
| 2,692,511 | Nallinger | Oct. 26, 1954 |
| 2,731,849 | Rockwood et al. | Jan. 24, 1956 |